United States Patent [19]

Verhaagen

[11] Patent Number: 4,710,004
[45] Date of Patent: Dec. 1, 1987

[54] IMAGE ROTATION SYSTEM
[75] Inventor: Ronald J. Verhaagen, Vadnais Heights, Minn.
[73] Assignee: Minnesota Mining and Manufacturing Company, St. Paul, Minn.
[21] Appl. No.: 18,425
[22] Filed: Feb. 25, 1987
[51] Int. Cl.$^4$ .............................................. G03B 23/12
[52] U.S. Cl. ...................................... 353/81; 353/101
[58] Field of Search .................... 353/81, 101; 350/287
[56] References Cited
U.S. PATENT DOCUMENTS
3,354,776 11/1967 Smitzer .............................. 353/81 X
4,436,391 3/1984 Kashiwagi ........................ 353/81 X Primary Examiner—Harry N. Haroian
Attorney, Agent, or Firm—Donald M. Sell; James A. Smith; David W. Anderson

[57] ABSTRACT

A device for supporting a dove prism is provided which permits the dove prism to slide axially and maintain contact with a projection lens assembly in a microfilm projection device. The prism holder is rotatable to permit rotation of the images and the dove prism floats within the prism holder to maintain contact upon focussing of a lens or to maintain contact with various lens barrel assemblies placed in the photographic system.

2 Claims, 2 Drawing Figures

IMAGE ROTATION SYSTEM

BACKGROUND OF THE INVENTION

1. Field of the Invention

This invention relates to an improved image rotation system for use with a microfilm reader, and in one aspect, to an improved prism holder for mounting a dove prism in a microfilm image projector.

2. Description of the Prior Art

Microfilm readers and reader-printers have utilized a projection lens to project an image from the microfilm onto a screen or to a light-sensitive media for copying the information on the microfilm. Microfilm comes in the form of a microfiche or individual strips of film. Focussing each microfilm image requires adjustment of the projection lens along its axis, and positioning of the image in the screen some times requires rotation of the image if the image is projected at an acute angle or if some of the images are in the comic mode and other images are in the cinematographic mode. Therefore, it is common for these projections systems to utilize a dove prism which can be rotated to rotate the projected image.

U.S. Pat. No. 4,494,840, issued Jan. 22, 1985, discloses an image rotation system wherein a projection lens is used in an adjustable lens barrel to focus the image on the screen 42 and a dove prism is mounted in a prism holder in fixed position above the projection lens and in generally axial alignment therewith to afford rotation of the image by rotation of the prism holder through the use of prism gears fixed to the prism holder and a rotatable drive gear 106.

Rotation prisms are also known for use with zoom lens systems for microfilm projectors such as shown in U.S. Pat. No. 3,360,325.

Because lenses for the projection system may invariably be changed on a single reader-printer to accommodate microfilm images of various reductions, and since it is usually mandatory to focus images on a film strip or in a microfiche between one image and the other because of the manner in which they are originally photographed, the projection lens must be adjusted to obtain proper focussing. In either event, the result is the lens is moved and it is desirable that the dove prism maintain a fixed position with respect to the projection lens so that the pupil remains substantially centered on the optic axis and receives the maximum amount of light from the projection lens.

It is an object of the present invention therefore to provide a prism holder which allows the prism to float along the optic axis and adjust its position upon a change in position of the projection lens.

It is an object of the present invention to provide a prism lens holder that allows the dove prism to move axially along the axis of the prism holder and yet not to fall out of the prism holder when changing lenses.

These and other objects will become apparent upon further description of the present invention.

SUMMARY OF THE INVENTION

The present invention relates to an improvement in a photographic apparatus for projecting images. The present invention provides an improved prism holder for a dove prism which permits the dove prism to move axially within the prism holder. The present invention provides an improved lens holder which permits a dove prism to move axially therein and yet not become displaced from the prism holder.

The present invention provides an improved photographic apparatus for projecting images from a projection lens by providing a prism holder mounted above the projection lens which permits the prism to move with respect to the prism holder along the optic axis of the projection lens upon adjustment axially of the projection lens for purposes of focussing, or when the lens is changed and a different length lens is placed in the lens holder.

The dove prism holder is a generally cylindrical member formed with radially projecting prism gears which permit the same to be rotated about its axis, a generally semicylindrical cavity is formed in the prism holder for receiving a dove prism having one reflecting surface and angled end members at approximately 45°, and portions of the prism may be truncated to permit the same to fit in the semicylindrical cavity. Stop means are provided at one end of the channel to engage the prism to limit its movement in one direction and a reduced size opening is provided at the other end of the channel through which one prism facet projects for engagement with the projection lens.

BRIEF DESCRIPTION OF THE DRAWINGS

The present invention will be described in greater detail with reference to the accompanying drawing wherein.

DETAILED DESCRIPTION

Figure 1:
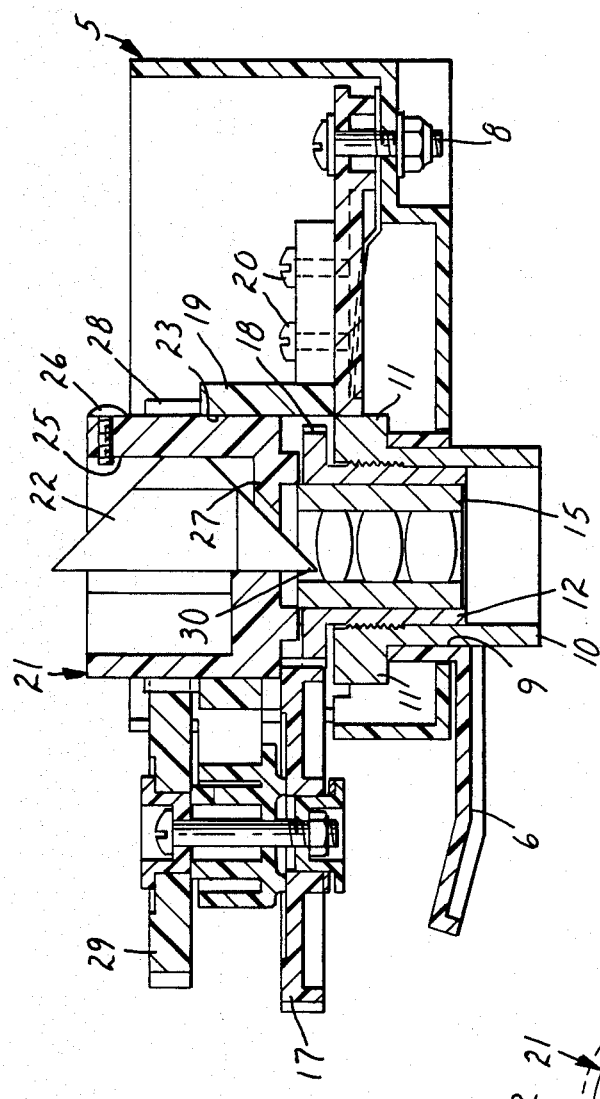
FIG. 1 is a vertical sectional view through a microfilm image projection system.

The present invention provides an improved holder for a dove prism for use in a microfilm projection system whether adapted specifically for viewing microfilm images provided on individual strips of film or images on a microfiche which is a piece of photographic material approximately 4×6 inches, having numerous frames in rows and columns which can vary in number, depending upon the reductions used in photographing the images.

The projection system is mounted on a frame generally designated 5 which is adapted to be attached to the cabinetry of a microfilm reader or reader-printer. The lens system is mounted on a subframe 6 which is pivoted about a pivot axis defined by a single mounting screw 8. The subframe includes at least one vertically disposed cylindrical cavity 9 in which is received a lens supporting housing 10 having axially disposed ears 11 to retain the same in fixed position within the cavity 9. The interior surface of the lens housing 10 is threaded to receive a collar 12 for supporting a projection lens and lens barrel assembly 15. The lens and barrel assembly are freely slidable within the collar or threaded insert 12, and the threaded housing and collar act to move the lens barrel up and down with respect to the housing 10 to focus the image. The collar is rotated by a focussing gear 17 rotatably mounted on the frame 5 and engaging a gear 18 surrounding the top of the collar 12.

Supported in a frame 19 which is secured by fasteners 20 to the subframe 6 is a prism holder 21 for a dove prism 22. The frame 19 has a cylindrical cavity which receives the cylindrical prism holder 21 such that the axis of the prism holder is aligned with the optic axis of the projection lens.

Figure 2:
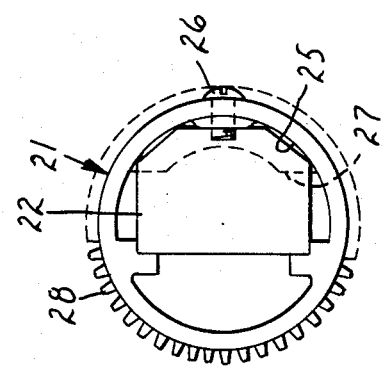
FIG. 2 is a plan view of the prism holder.

As seen in FIGS. 1 and 2, the prism holder 21 has a generally semicylindrical cavity 25 which receives the dove prism 22 and permits the same to slide along its axis. At the upper end of the cavity 25 is an end of a set screw 26 which restricts movement of the dove prism outside of the cavity, and at the opposite end of the cavity is a wall 27 having a window which permits one facet of the prism to project beyond the wall 27 and the edge 30 to engage the wall of the lens and lens barrel assembly 15. This places the facet of the prism as close to the lens as possible and maintains the position of the prism and lens throughout their range of movement.

The prism holder 21 is rotated about its axis by a prism rotating gear 29 which is mounted coaxially with the focussing gear 17 and engages a tooth gear 28 formed about the exterior of the prism holder 21.

As seen most clearly in FIG. 2, the dove prism 22 is slightly bifurcated on its inactive face to permit the same to be received in the semicylindrical prism holder cavity 25.

The prism holder clearly permits the dove prism to slide axially with respect to the prism holder upon the lens barrel 15 being adjusted upwardly or downwardly by the focussing gear 17 and collar 12 or it may be readily removed by moving the prism holder from the cavity 23 of the frame 19 to permit a different lens barrel 15 to be inserted in the collar 12. Upon placing the prism holder back in the frame 19, then the prism will readily adjust to the upper surface of the different lens and lens barrel assembly.

Having thus described the present invention with respect to a preferred embodiment, it will be understood that changes may be made therein without departing from the spirit or scope of the invention claimed.

I claim:

1. In a photographic apparatus for projecting images, a projection lens barrel assembly, said lens barrel assembly being disposed in an axially adjustable collar for focussing, and a dove prism being mounted in axial alignment with said projection lens barrel assembly in a rotatable prism holder, wherein said dove prism is slidable in said prism holder to maintain contact with said projection lens barrel assembly during axial movement thereof.

2. A dove prism holder comprising a cylindrical member having an axially disposed cavity for receiving a dove prism and having an exterior tooth gear for rotation of the prism holder, means for restricting movement of said dove prism in said cavity at one end of said cavity and wall means at the other end of said cavity permitting one facet of the dove prism to project therethrough for engagement with a lens barrel, said wall means and said means for restricting movement of said dove prism being spaced to allow sliding movement of the dove prism in said cavity therebetween.

* * * * *